(12) United States Patent  (10) Patent No.: US 9,408,375 B2
Miller et al.  (45) Date of Patent: Aug. 9, 2016

(54) FIVE-SIDED AQUARIUM NET

(71) Applicants: Mitchell E Miller, Damascus, OR (US); David J Gleason, Damascus, OR (US)

(72) Inventors: Mitchell E Miller, Damascus, OR (US); David J Gleason, Damascus, OR (US)

( * ) Notice: Subject to any disclaimer, the term of this patent is extended or adjusted under 35 U.S.C. 154(b) by 262 days.

(21) Appl. No.: 13/968,420

(22) Filed: Aug. 15, 2013

(65) Prior Publication Data
US 2014/0047757 A1  Feb. 20, 2014

Related U.S. Application Data

(60) Provisional application No. 61/683,599, filed on Aug. 15, 2012.

(51) Int. Cl.
*A01K 75/00* (2006.01)
*A01K 77/00* (2006.01)

(52) U.S. Cl.
CPC ............ *A01K 77/00* (2013.01); *A01K 75/00* (2013.01)

(58) Field of Classification Search
CPC ........ A01K 73/12; A01K 75/00; A01K 77/00
USPC .......................................... 43/7, 8, 10, 11, 12
See application file for complete search history.

(56) References Cited

U.S. PATENT DOCUMENTS

| | | | | |
|---|---|---|---|---|
| 609,160 | A * | 8/1898 | McWithey | 99/323.5 |
| 2,950,939 | A * | 8/1960 | Van Volkenburgh | 294/16 |
| 3,692,347 | A * | 9/1972 | Bixler | 294/50.8 |
| 4,272,906 | A | 6/1981 | Liebling | |
| 4,774,785 | A * | 10/1988 | Fuhrman | 43/63 |
| 5,027,549 | A * | 7/1991 | Person | 43/134 |
| 5,199,756 | A | 4/1993 | Bartlett | |
| 5,822,908 | A | 10/1998 | Blanchard | |
| 6,062,168 | A * | 5/2000 | Host et al. | 119/161 |
| 6,092,847 | A * | 7/2000 | Kwan | 294/16 |
| 6,412,213 | B1 * | 7/2002 | Wellard | 43/12 |
| 7,090,269 | B2 * | 8/2006 | Kelsey | 294/118 |
| 7,311,344 | B2 | 12/2007 | Kerr | |
| 7,448,660 | B2 * | 11/2008 | Yamanaka et al. | 294/16 |
| 7,644,532 | B2 | 1/2010 | Capio | |
| 7,814,701 | B1 * | 10/2010 | Sanchez, Sr. | 43/5 |
| 8,356,443 | B1 * | 1/2013 | Hume | 43/11 |
| 8,662,547 | B2 * | 3/2014 | Jossem | 294/16 |

\* cited by examiner

*Primary Examiner* — David Parsley (57) ABSTRACT

A double-headed five-sided fishing net uses a pair of net heads to enclose a fish from two opposing sides and uses a lateral net to enclose a fish from three additional sides. The lateral net is connected in between the pair of net heads on three sides so that the front side is an opening that can be used to capture fish. A tong assembly allows a user to press the pair of net heads against each other, which puts the fishing net into a closed position. In addition, the tong assembly continuously applies a force by a torsion spring to separate the pair of net heads from each other, which puts the fishing net into an open position. In order to counter the continuous force from the torsion spring, the fishing net has a locking mechanism to hold the tong assembly in the closed position.

1 Claim, 13 Drawing Sheets

FIVE-SIDED AQUARIUM NET

The current application claims a priority to the U.S. Provisional Patent application Ser. No. 61/683,599 filed on Aug. 15, 2012.

FIELD OF THE INVENTION

The present invention relates generally to nets for catching fish in a fish tank. More specifically, the present invention is a double headed five sided fishnet which creates a trap or cage, and leaves no route for the fish to escape by. This allows the user to easily catch fish within the fish tank.

BACKGROUND OF THE INVENTION

Fish tanks are a common decorative fixture in many homes and businesses. Fish tanks provide a visually pleasing aesthetic as well as a soothing sound created by their water oxygenators. All fish tanks require a certain amount of maintenance in order to keep the environment within healthy and the fish residing in the tank in good condition. one of the most common forms of fish tank maintenance is simply cleaning the tank. Of course, cleaning the fish tank requires that the fish residing within be temporarily removed and stored in alternative tank while their primary fish tank is being cleaned. To catch and remove the fish from the fish tank, a wide range of fishnets designed specifically for that purpose have been developed and produced. These fishnets are also used in pet stores when a person purchases a new fish for their fish tank. The pet store worker must capture the often specifically chosen fish for the customer and secure that fish in a bag for transport to the customers fish tank. This can be extremely difficult with a traditional one headed fishnet as fish can be particularly agile. This difficulty is caused by the design of traditional fishnets which comprise a handle and one net head. This design often requires the person attempting to catch the fish to be very quick and or ambush the fish when it is least expecting to be captured. This can be both frustrating and time consuming for the person as they may wish to move on to other tasks instead of trying to catch a quick fish all day long. Therefore, it is an object of the present invention to create an apparatus which facilitates the swift and easy capturing of fish in a fish tank. The present invention utilizes a dual headed design that is attached to a pair of articulated tongs capable of opening and closing. Additionally, the present invention has a side skirt net which closes off 3 sides of the net end of the apparatus in addition to the two sides already netted by the dual net heads. This configuration makes sure that only one side (the front) of the six sided net end is open, closing off any route of escape for the fish, making it very easy for a user to catch fish by simply lowering the net end directly down around the fish and closing the apparatus, allowing easy removal of the fish from the tank.

There are several inventions which have been designed with similar objectives; such as U.S. Pat. No. 7,644,532. The apparatus disclosed in U.S. Pat. No. 7,644,532 is similar to the present invention in that the disclosed apparatus also utilizes a double headed fish net which is articulated to open and close. However, this is where the similarities end. The patent disclosure utilizes a scissor like design to allow the user to open and close the net end of the apparatus. The present invention utilizes a tong structure which possesses a pivot at the far end of the tong assembly as well as a locking mechanism to lock the present invention in the closed position. The tong design has several advantages over the scissor design of the patent disclosure including swifter and easier opening and closing of the net end as well as easy storage due to the locking mechanism which keeps the present invention closed and compact.

The locking tong design is obviously well established by many patents such as U.S. Pat. No. 7,311,344. The patent disclosure is a pair of tongs for serving food which also possesses a locking mechanism. This design is conceptually very similar to the present invention. This biggest difference between the patent disclosure and the present invention is the fact that the present invention takes the basic locking tong concept and applies it to a completely different and non obvious use. With the help of additional components, namely the five sided dual net head, the present invention is an effective fish catching apparatus that utilizes the basic tong design to allow for easy articulation of the apparatus for transition between the open and closed positions. Additionally, the present invention does utilize a very different locking mechanism which is much closer in design to U.S. Pat. No. 5,199,756. The locking mechanism in the patent disclosure is a shaped piece which physically blocks the tongs from opening; this is very similar to the locking mechanism utilized in the present invention. While the locking mechanism utilized in the present invention may not be a very novel concept it is being used for the non obvious application of keeping a fishnet closed so that the fish cannot escape as a result of user error. The locking mechanism of the present invention is also used for the original purpose of keeping the apparatus in the closed position, thus, keeping the apparatus compact so it may be easily stored.

Other prior art such as the extremely similar disclosures of U.S. Pat. No. 4,272,906 and U.S. Pat. No. 5,822,908 again have similar objectives as the present invention. Both patent disclosures are designed to facilitate the capture of fish in a fish tank, and both have only one opening in the net head. both disclosures provide a way to quickly close the one opening, thus trapping the fish within the net head. However, the overall design of both disclosures does not differ much from the design of a standard single headed fishnet and as such are not much more effective at capturing fish. The modifications present on both disclosures server simply to enclose the fish in the net which does facilitate brining the fish to the surface of the tank more easily, as the fish cannot escape the net, but does not facilitate the initial capture of the fish. The present invention is clearly different from both disclosures as the present invention utilizes the five sided dual headed net and tong design to facilitate the swift and easy capture of the fish as well as easing the transition to the surface of the tank by allowing the net to be locked closed by the locking mechanism in the tongs.

In summary, the present invention is a drastic improvement upon the prior art and accomplishes this by using non-obvious combinations of existing concepts and several novel concepts to create the apparatus that is the present invention.

DETAILED DESCRIPTIONS OF THE INVENTION

All illustrations of the drawings are for the purpose of describing selected versions of the present invention and are not intended to limit the scope of the present invention.

Figure 1:
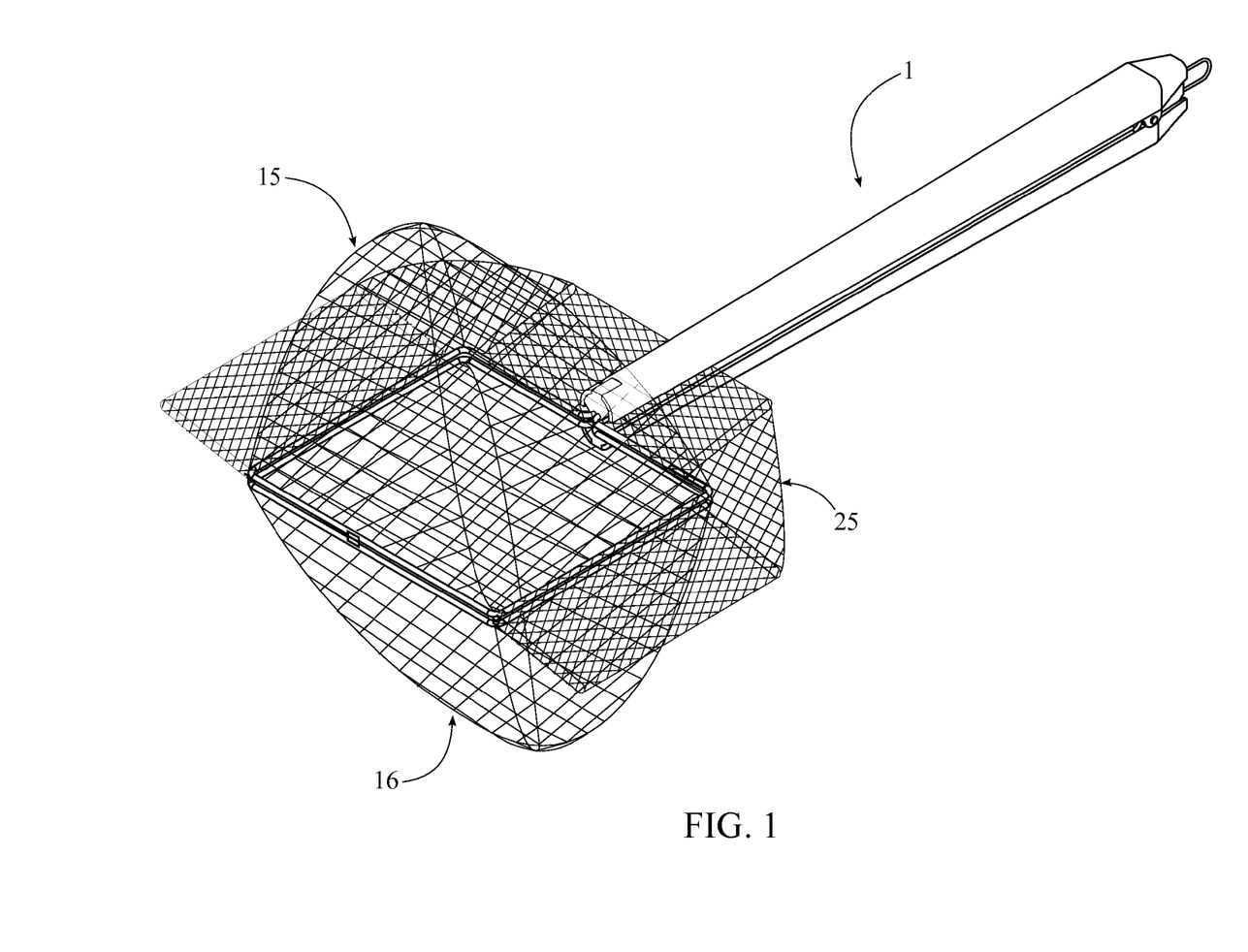
FIG. 1 is a perspective view of the present invention in the closed position.
Figure 2:
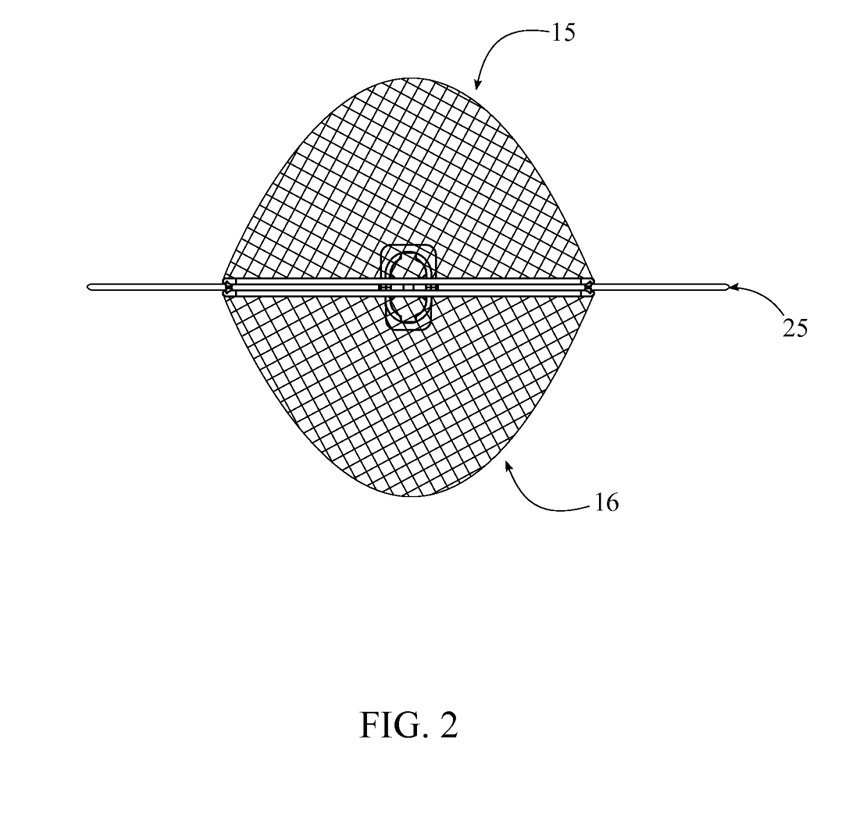
FIG. 2 is a front view of the present invention in the closed position.
Figure 4:
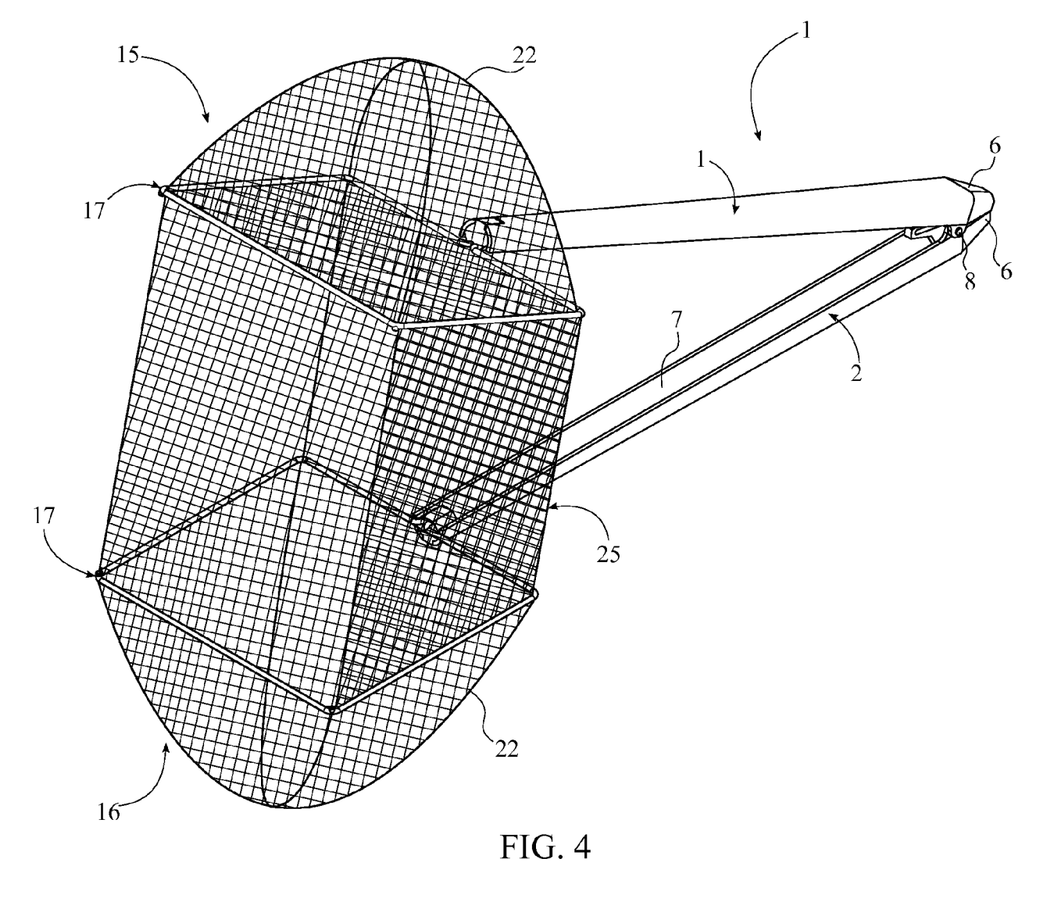
FIG. 4 is a perspective view of the present invention in the open position.
Figure 5:
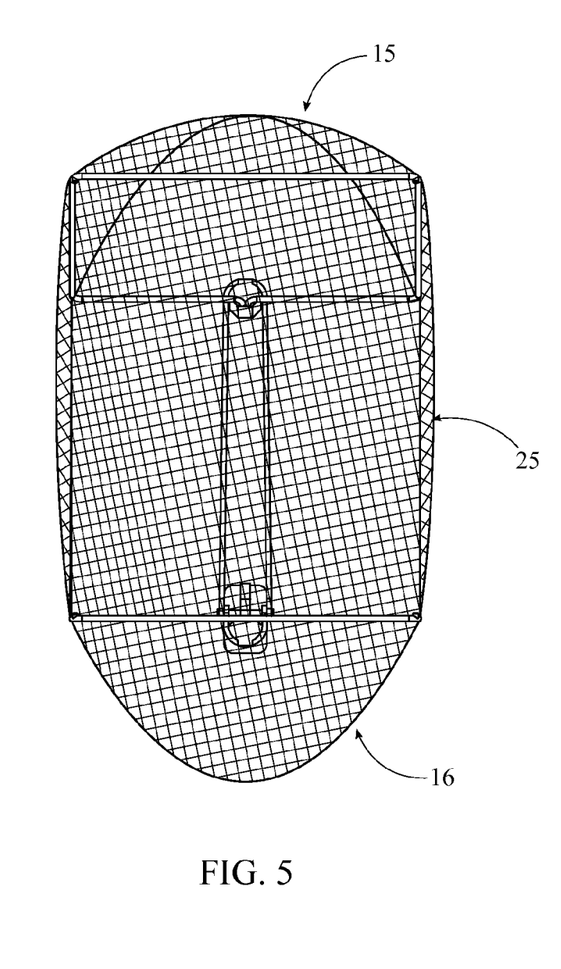
FIG. 5 is a front view of the present invention in the open position.

As can be seen in FIGS. 1 and 4, the present invention is a double-headed five-sided fishing net that allows a user to more efficiently and effectively swift through a fishing tank and capture a fish. The present invention mainly comprises a tong assembly 1, a first net head 15, a second net head 16, and a lateral net 25. The tong assembly 1 allows a user to properly grasp the present invention and clasp the first net head 15 and the second net head 16 together. The first net head 15 and the second net head 16 allow the present invention to surround a fish from two opposing sides. The lateral net 25 allows the present invention to surround the fish from three additional sides. Consequently, the first net head 15, the second net head 16, and the lateral net 25 are used to form a five-sided fishing net, which allows a user to more easily capture a fish by enclosing the fish on five different sides.

Figure 3:
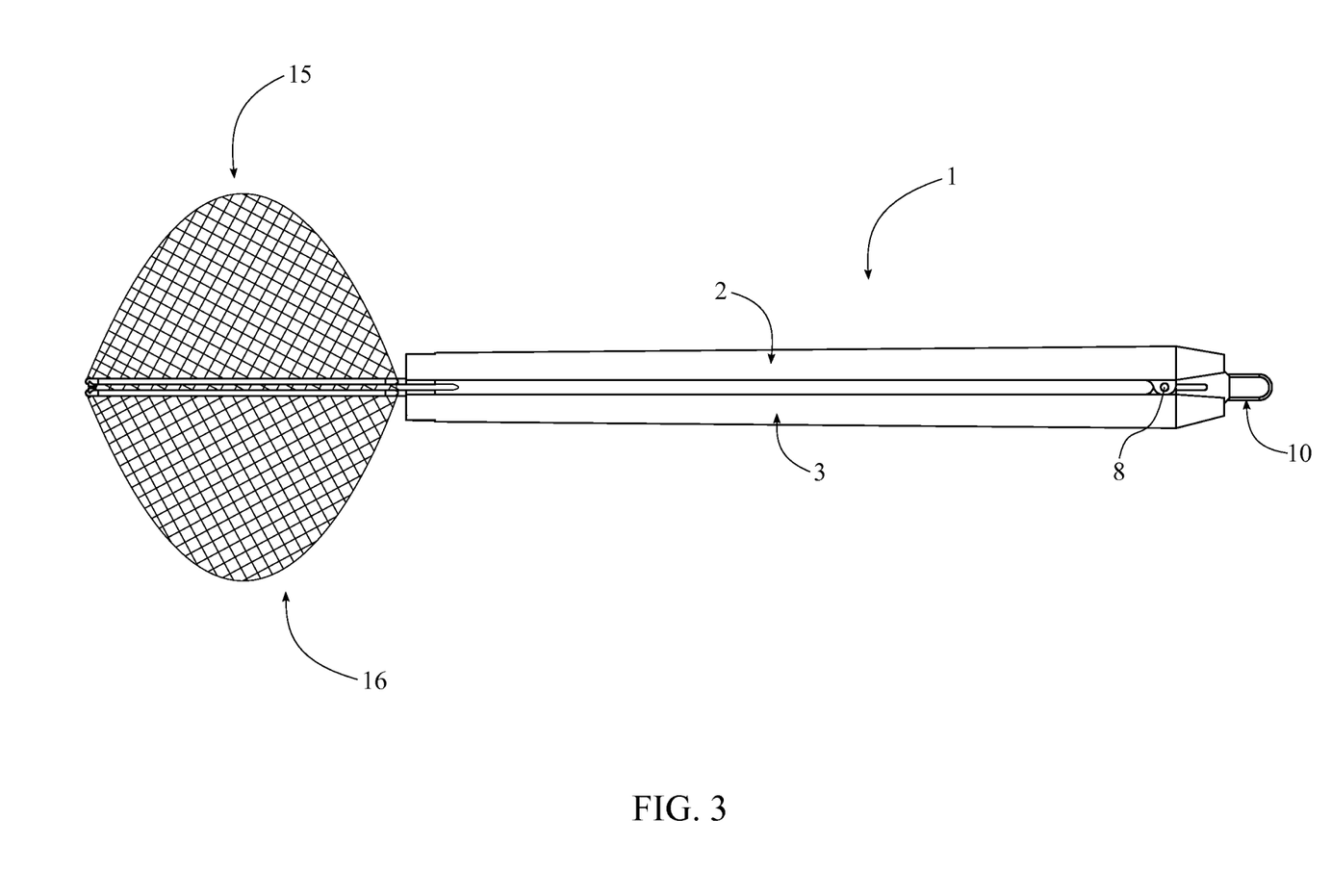
FIG. 3 is a left side view of the present invention in the closed position.
Figure 6:
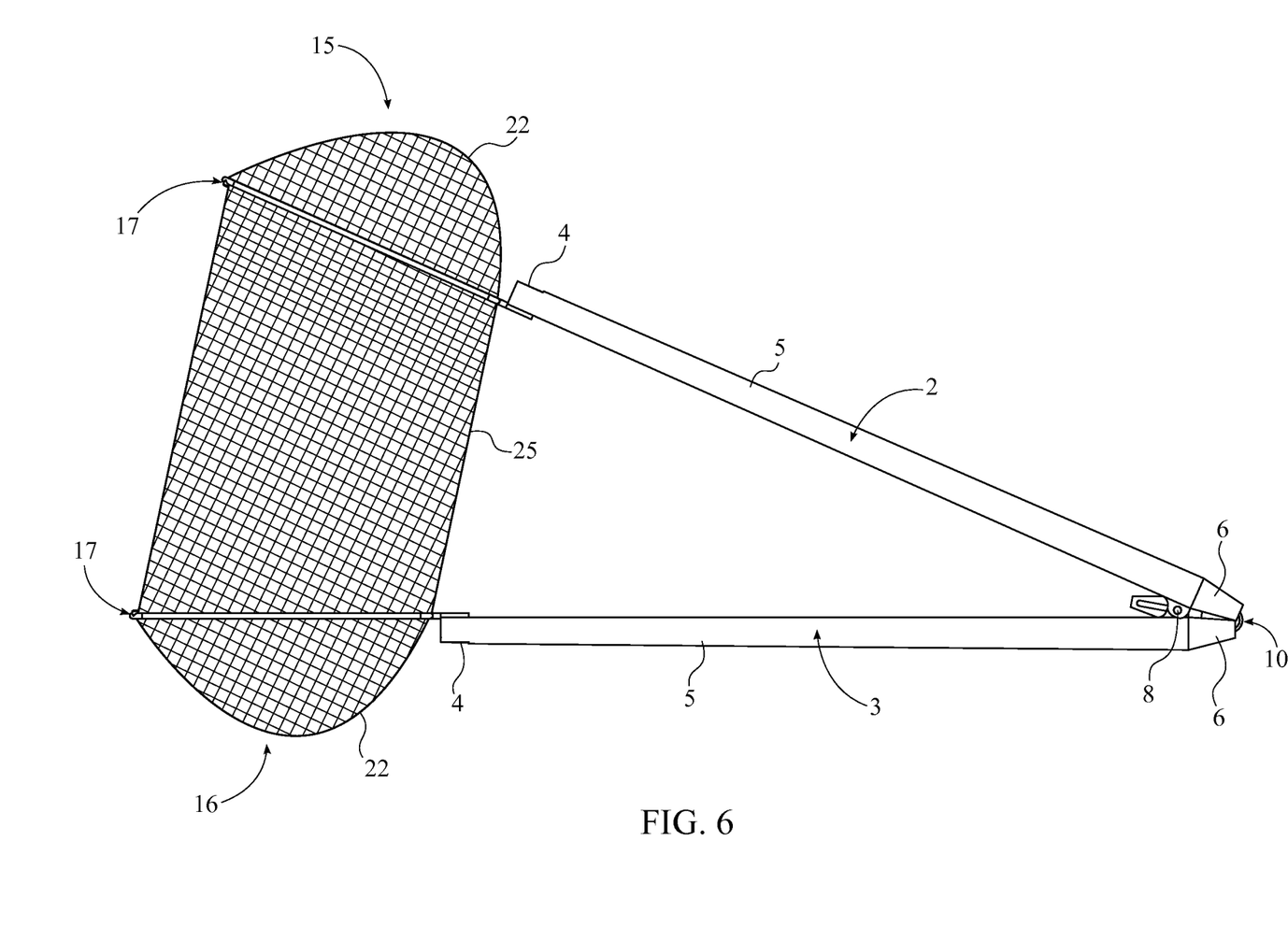
FIG. 6 is a left side view of the present invention in the open position.

The tong assembly 1 is an ergonomically designed clamping tool that is used to operate the present invention, which illustrated in FIGS. 3 and 6. The tong assembly 1 comprises a first arm 2, a second arm 3, a pivot axle 8, a torsion spring 9, and a locking mechanism 10. The first arm 2 and the second arm 3 are structural components of the tong assembly 1 that are held and pressed together by a user in order to move the first net head 15 and the second net head 16 towards each other. The pivot axle 8 is used as a fulcrum from the first arm 2 and the second arm 3. Thus, the first arm 2 and the second arm 3 are pivotally connected to each other by the pivot axle 8, which allows the first arm 2 and the second arm 3 to function as a kind of scissor mechanism. In addition, the first arm 2 and the second arm 3 each comprise a receiving end 4, an intermediate portion 5, and a tapered end 6. The receiving end 4 allows the first arm 2 to attach to the first net head 15 and allows the second arm 3 to attach to the second net head 16. The intermediate portion 5 is the main body for either the first arm 2 or the second arm 3. The tapered end 6 for both the first arm 2 and the second arm 3 are used by the locking mechanism 10 to hold the first net head 15 and the second net head 16 together.

Figure 9:
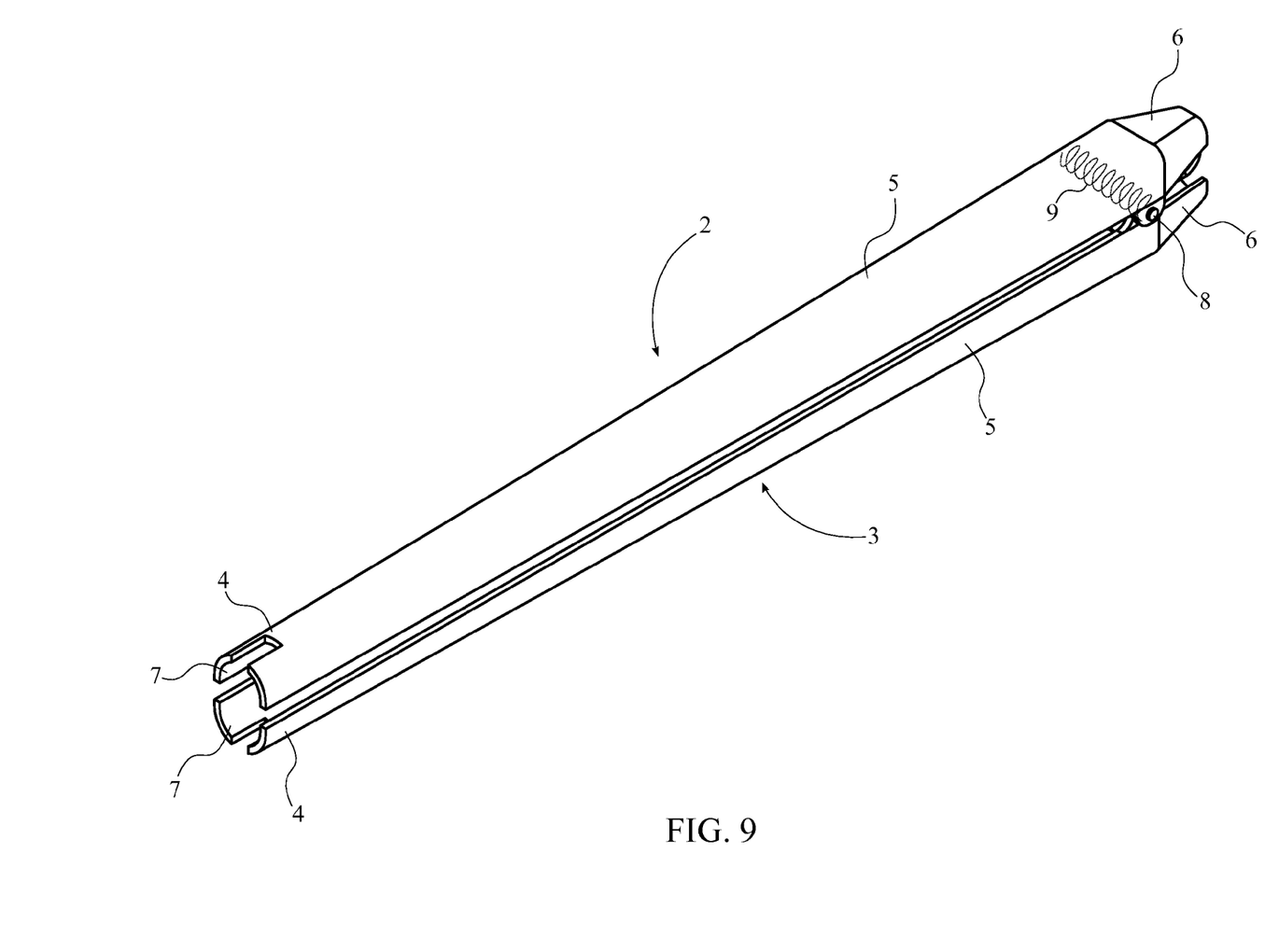
FIG. 9 is a perspective view of the tong assembly in the closed position so that the receiving end of each arm can be seen more clearly.
Figure 10:
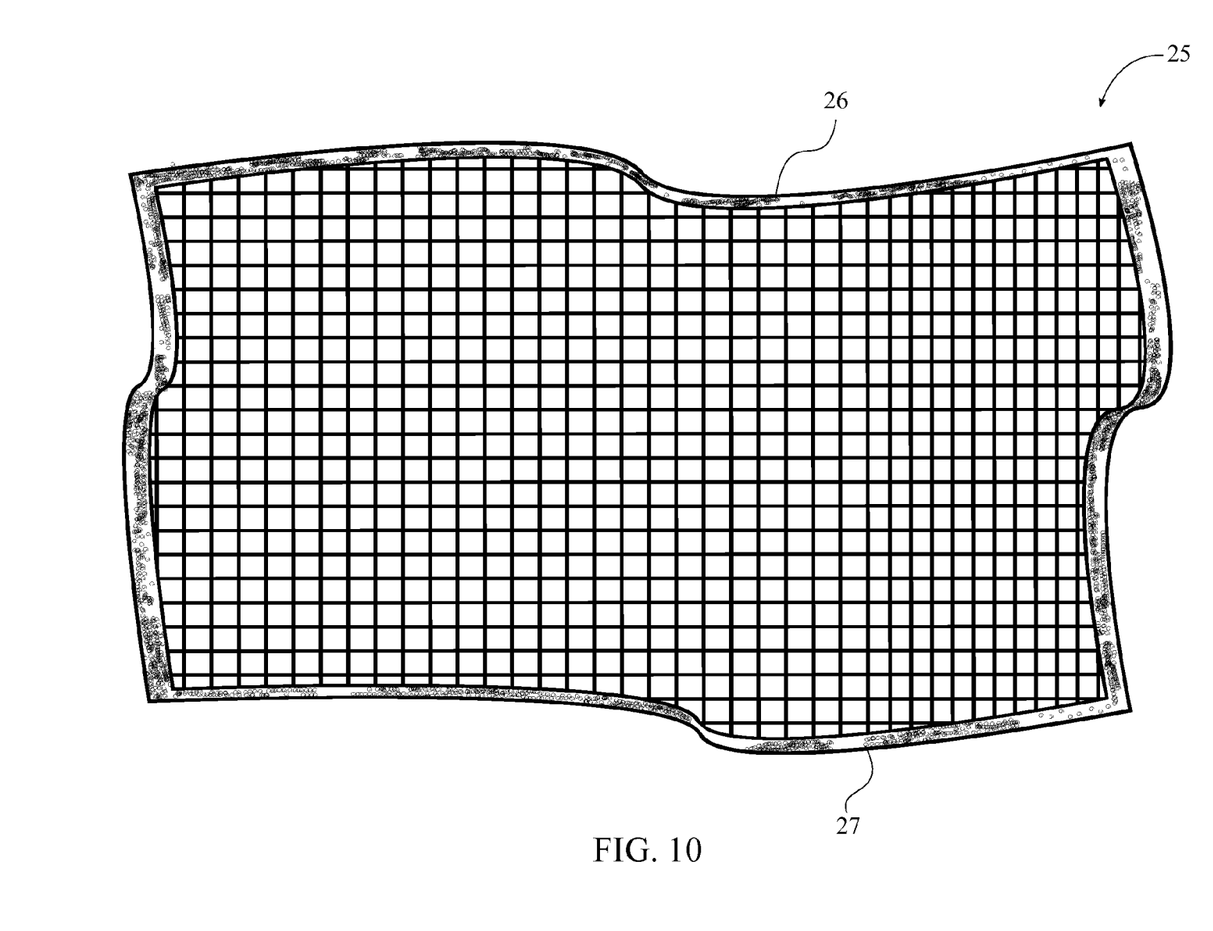
FIG. 10 is a front view of the lateral net removed from the rest of the present invention. The rectangular shape and hook and loop fasteners used to connect the side net to the present invention are clearly seen in this figure.

In reference to FIG. 9, the receiving end 4, the intermediate portion 5, and the tapered end 6 can also be used to describe the positioning of the pivot axle 8 along the tong assembly 1. The pivot axle 8 traverses through the intermediate portion 5 adjacent to the tapered end 6 for the first arm 2, and the pivot axle 8 similarly traverses through the intermediate portion 5 adjacent to the tapered end 6 for the second arm 3. This positioning allows a user to precisely control the angle between the first arm 2 and the second arm 3 and, thus, precisely control the separation between the first net head 15 and the second net head 16. A user needs to mimic the live movements of a fish swimming through a fish tank and having precise control over the separation between the first arm 2 and the second arm 3 assists the user in capturing the fish. In addition, the torsion spring 9 is used to keep the first arm 2 and the second arm 3 at an equilibrium angle and automatically pivots the first arm 2 and the second arm 3 back to the equilibrium angle once a user is finished pressing the first net head 15 and the second net head 16 together. The pivot axle 8 is encircled by the torsion spring 9 so that the torsion spring 9 acts on the same rotational axis as the pivot axle 8. In order to separate the first net head 15 from the second net head 16, the torsion spring 9 is configured to outwardly press against the intermediate portion 5 of the first arm 2 and is configured to outwardly press against the intermediate portion 5 of the second arm 3. Thus, the torsion spring 9 allows a user to tactilely control the separation between the first net head 15 and the second net head 16.

Figure 12:
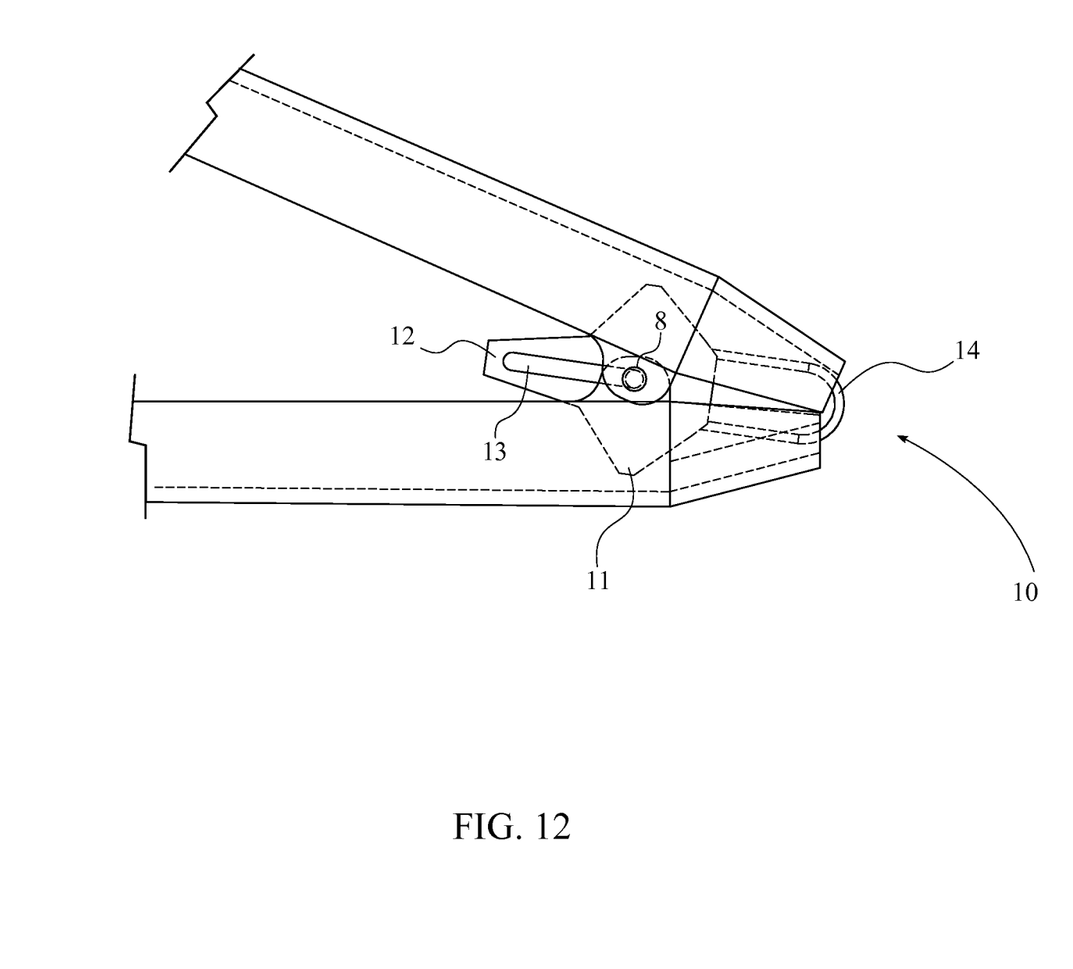
FIG. 12 is a magnified top view of the locking mechanism being disengaged for the present invention.
Figure 13:
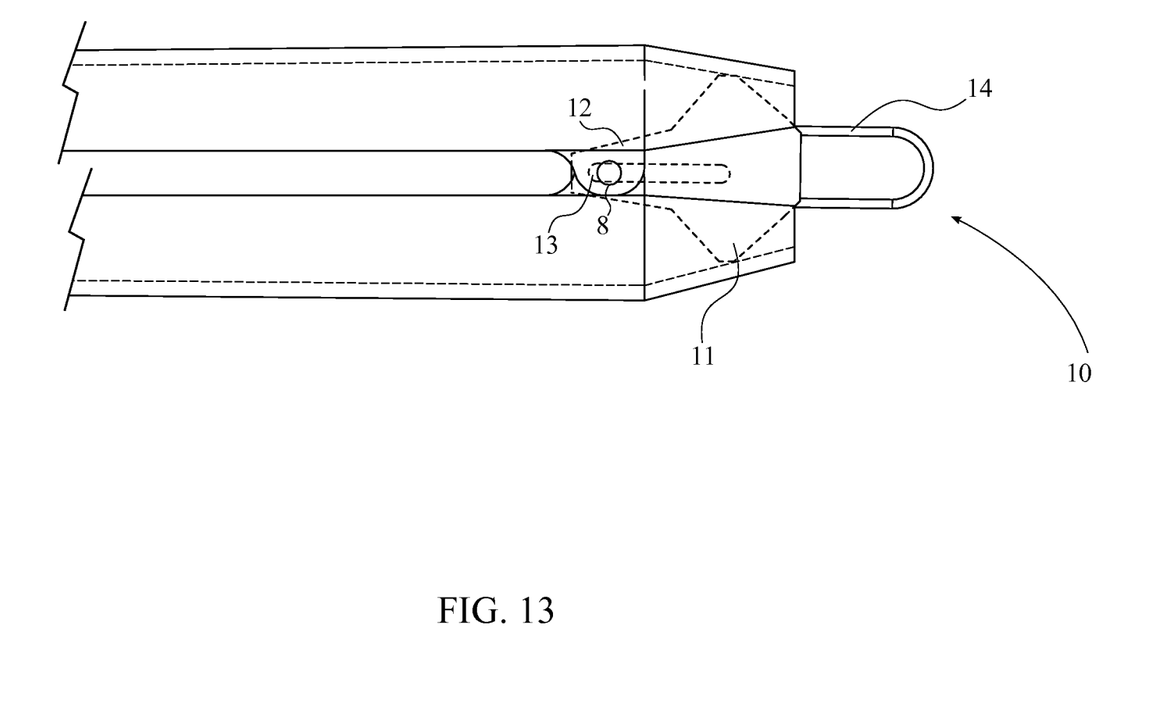
FIG. 13 is a magnified top view of the locking mechanism being engaged for the present invention.

As can be seen in FIGS. 1 and 3, the first net head 15 and the second net head 16 can be held together by locking the first arm 2 and the second arm 3 in place with the locking mechanism 10 and, thus, holds the present invention in the closed position. In the preferred embodiment of the present invention, the locking mechanism 10 comprises a full-width portion 11, a narrowing portion 12, a slot 13, and a pull tab 14. The full-width portion 11 and the narrowing portion 12 are the body of the locking mechanism 10 and are shaped to lock or unlock the tong assembly 1 from in between the first arm 2 and the second arm 3. The narrowing portion 12 is connected adjacent to the full-width portion 11, and the pull tab 14 is also connected adjacent to the full-width portion 11 opposite to the narrowing portion 12. The pull tab 14 is used to engage or disengage the locking mechanism 10. The pull tab 14 can also have an annular shape so that the present invention can be hung from the pull tab 14. The slot 13 is an elongated hole that traverses normal through the full-width portion 11 and the narrowing portion 12. Moreover, the slot 13 is positioned along the full-width portion 11 and the narrowing portion 12. The pivot axle 8 is positioned through the slot 13 so that the locking mechanism 10 is constrained to the tong assembly 1. In addition, the first arm 2 and the second arm 3 each comprise an inner groove 7 that traverses along the tapered end 6 and into the intermediate portion 5. The full-width portion 11 is slidably engaged in between the inner groove 7 of the first net head 15 and the inner groove 7 of the second net head 16. This configuration allows the user to very easily engage or disengage the locking mechanism 10 by sliding the locking mechanism 10 back and forth, relative to the length of the tong assembly 1. In reference to FIG. 12, if the locking mechanism 10 is disengaged, then the pivot axle 8 should be positioned within the full-width portion 11 so that the full-width portion 11 does not hinder the pivotally movement of the first arm 2 and the second arm 3. In reference to FIG. 13, if the locking mechanism 10 is engaged, then the pivot axle 8 should be positioned within the narrowing portion 12, and the full-width portion 11 should be positioned in between the tapered end 6 of the first arm 2 and the tapered end 6 of the second arm 3. Thus, the tapered end 6 for both the first arm 2 and the second arm 3 narrows the distance between the first arm 2 and the second arm 3 so that the full-width portion 11 can properly wedge in between the first arm 2 and the second arm 3 and lock the first arm 2 and the second arm 3 in place.

Figure 7:
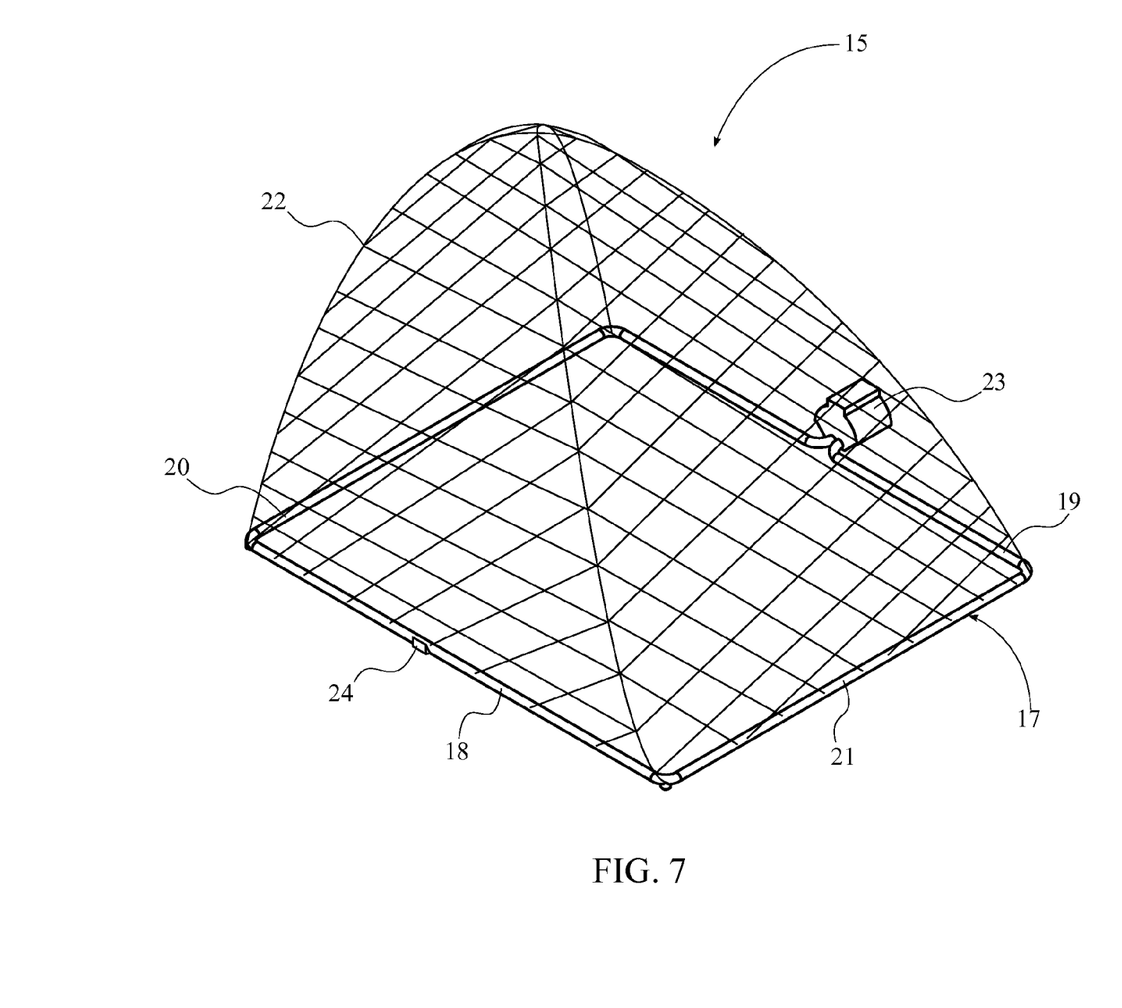
FIG. 7 is a perspective view of the first net head removed from the tong assembly of the present invention.
Figure 8:
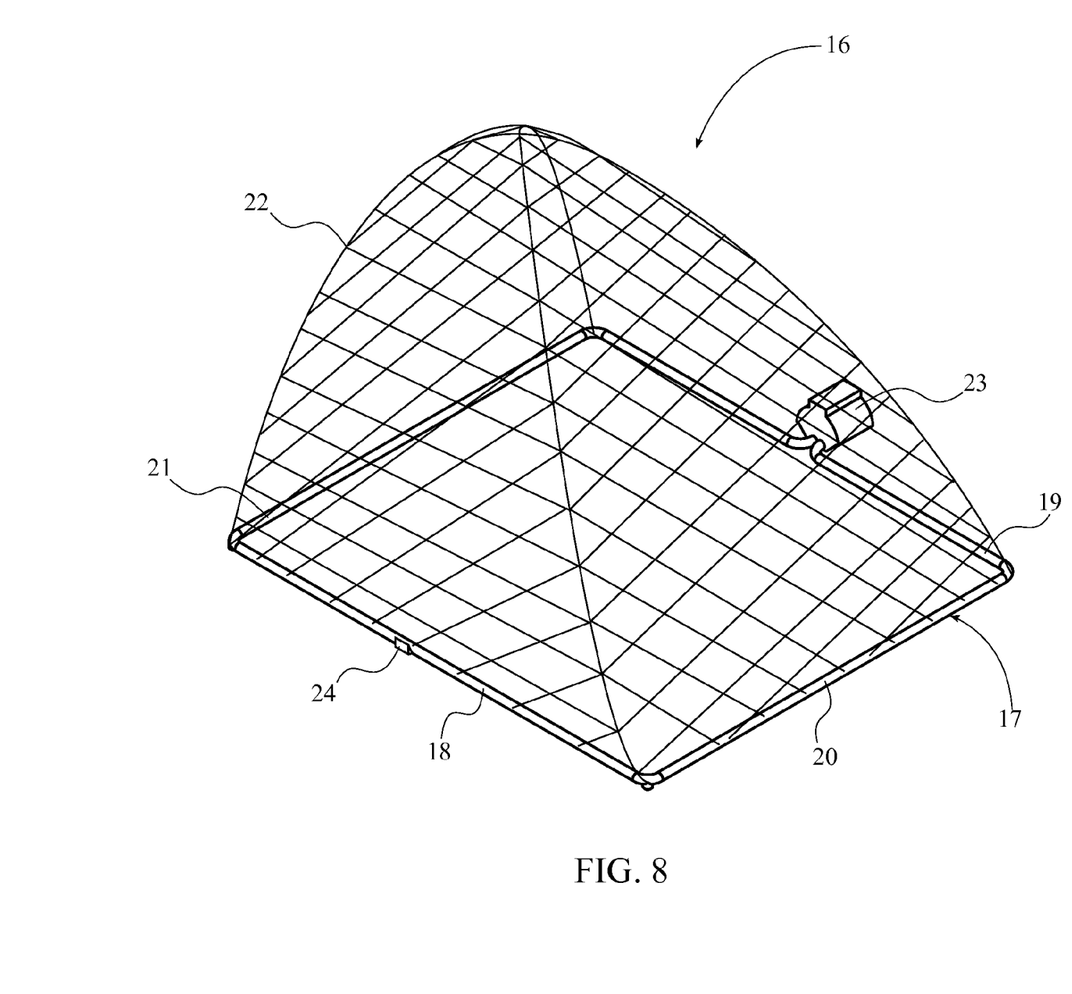
FIG. 8 is a perspective view of the second net head removed from the tong assembly of the present invention.
Figure 11:
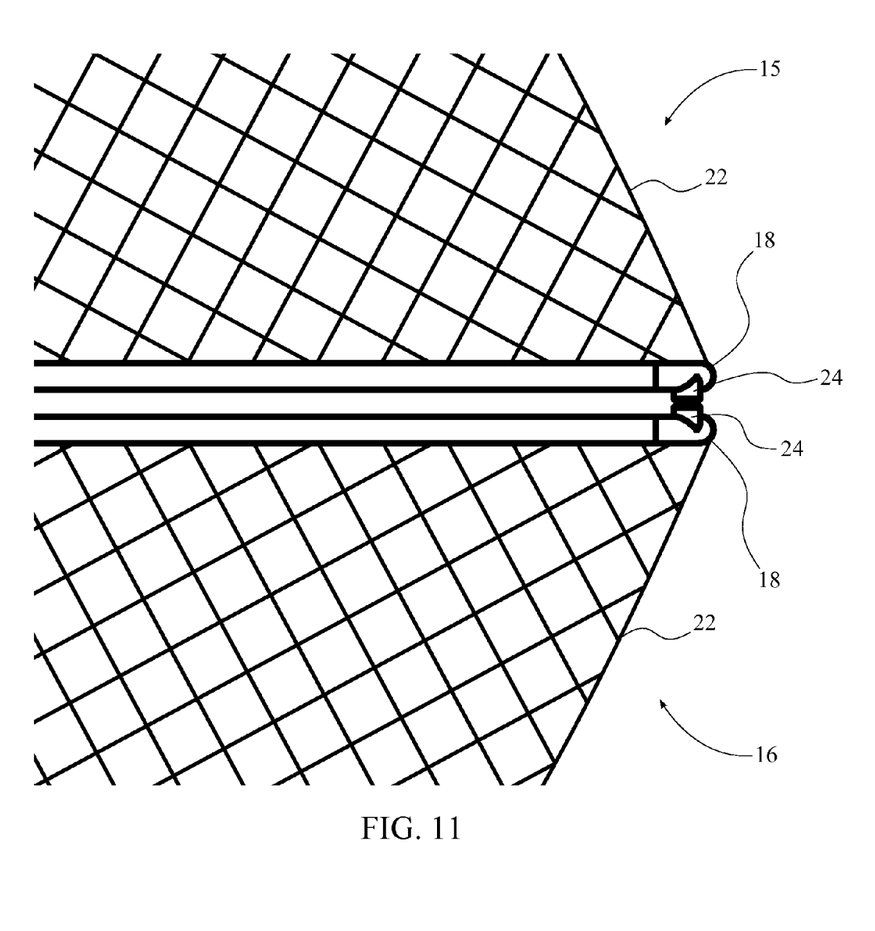
FIG. 11 is a magnified right side view of the present invention to more clearly display the stop for both the first net head and the second net head.

The first net head 15 and the second net head 16 are the primary means of the present invention to enclose and capture a fish within a fish tank, which are illustrated in FIGS. 7 and 8. The first net head 15 and the second net head 16 each comprise a brim 17, a net 22, an attachment post 23, and a stop 24. The brim 17 is the structural component of either the first net head 15 or the second net head 16 and is used to guide the net 22 while capturing a fish. The brim 17 comprises a front section 18, a back section 19, a left section 20, and a right section 21. In the preferred embodiment of the present invention, the brim 17 can be, but not limited to, a square shape. The net 22 is perimetrically connected to the brim 17 so that the brim 17 can guide the entirety of the net 22 and so that the net 22 acts as a loose pocket while capturing fish. In addition, the attachment post 23 and the stop 24 are positioned opposite to each other across the brim 17. When the first net head 15 and the second net head 16 are pressed against each other, the stop 24 prevents direct contact between the first net head 15 and the second net head 16 and provides a small gap in between the first net head 15 and the second net head 16. As can be seen in FIG. 11, the small gap is large enough to minimize the chance of crush injury to a fish but small enough to prevent the fish from escaping the present invention while the present invention has successfully captured the fish. The stop 24 is centrally connected to the front section 18 of the brim 17, which provides an evenly distributed spacing around the perimeter of the brim 17. In another embodiment of the present invention, a plurality of stops can connected to the corners of a brim 17. The attachment post 23 allows the brim 17 to be attached to the tong assembly 1 and is centrally connected to the back section 19 of the brim 17 so that the tong assembly 1 does not interfere while capturing fish with the present invention.

The attachment post 23 also allows different kinds and sizes of the net heads to be attached or detached from the tong assembly 1. This modular design allows for a wide range of different net heads to be attached to the tong assembly 1 and, thus, drastically increases the utility of the present invention. In an alternative embodiment of the present invention, the first net head 15 and the second net head 16 are permanently connected to the tong assembly 1. This embodiment of the present invention, though inferior in utility, may be easier and cheaper to produce, and may be more appealing to those users who do not wish or need to change the size or shape of the net heads that are attached to the tong assembly 1.

In reference to FIGS. 3 and 6, the overall configuration allows the present invention to form a five-sided net while the present invention is in the open position. More specifically, the attachment post 23 of the first net head 15 is attached to receiving end 4 of the first arm 2, and the attachment post 23 of the second net head 16 is attached to the receiving end 4 of the second arm 3 so that the present invention can enclose and capture a fish from two sides. In the preferred embodiment of the present invention, the receiving end 4 includes a keyway and a fastener in order to proper secure a net head to one arm of the tong assembly 1. The stop 24 of the first net head 15 and the stop 24 of the second net head 16 are positioned adjacent to each other so that the stop 24 of the first net head 15 and the stop 24 of the second net head 16 press against each other while the present invention is in the closed position. The present invention is also configured in such as way that the brim 17 for both the first net head 15 and the second net head 16 is located in between the net 22 of the first net head 15 and the net 22 for the second net head 16, which allows the lateral net 25 to be connected in between the brim 17 of the first net head 15 and the brim 17 of the second net head 16. The lateral net 25 allows the present invention to enclose and capture a fish from three additional sides. The top side 26 of the lateral net 25 is attached along the left section 20, the back section 19, and the right section 21 of the first net head 15, and the bottom side 27 of the lateral net 25 is attached along the left section 20, the back section 19, and the right section 21 of the second net head 16. Consequently, the net 22 of the first net head 15, the net 22 of second net head 16, and the lateral net 25 form a five-sided fishing net while the present invention in the open position. The opening for the five-sided fishing net is located in between the front section 18 of the first net head 15 and the front section 18 of the second net head 16, and this opening allows a fish to enter the five-sided fishing net and be captured by the present invention. Once a fish enters the five-sided fishing net, the present invention is put into the closed position, and the fish is temporarily stored within either the first net head 15 or the second net head 16, which have a net 22 with the slack needed to store the fish.

In an alternative embodiment of the present invention, the lateral net 25 is attached to the first net head 15 and the second net head 16 via a series of hook and loop fasteners, which allow the lateral net 25 to be easily removed from the present invention. The lateral net 25 may then be easily removed and replaced with a pocketed side net, which features loose nets much like those of the first net head 15 and the second net head 16. Alternative side nets may also be attached using this embodiment including, but not limited to, tighter side nets, side nets with smaller holes, and side nets with larger holes.

Although the invention has been explained in relation to its preferred embodiment, it is to be understood that many other possible modifications and variations can be made without departing from the spirit and scope of the invention as hereinafter claimed.

What is claimed is:
1. A double-headed five-sided fishing net comprises:
a tong assembly;
a first net head;
a second net head;
a lateral net having three sides;
said tong assembly comprises a first arm, a second arm, a pivot axle, a torsion spring, and a locking mechanism;
said first net head and a second net head each comprise a brim, a net, an attachment post, and a stop;
said first arm and said second arm each comprises a receiving end, an intermediate portion, and a tapered end; and
said brim comprises a front section, a back section, a left section, and a right section;
said first arm and second arm being pivotally connected to each other by said pivot axle;
said pivot axle traversing through said intermediate portion adjacent to said tapered end for said first arm;
said pivot axle traversing through said intermediate portion adjacent to said tapered end for said second arm;
said pivot axle being encircled by said torsion spring;
said torsion spring being configured to outwardly press against said intermediate portion of said first arm;
said torsion spring being configured to outwardly press against said intermediate portion of said second arm;
said net being perimetrically connected to said brim;
said stop and said attachment post being positioned opposite to each other across said brim;
said stop being centrally connected to said front section;
said attachment post being centrally connected to said back section;

a top side of said lateral net being attached along said left section, said back section, and said right section of said first net head;
a bottom side of said lateral net being attached along said left section, said back section, and said right section of said second net head;
said net of said first net head, said net of said second net head, and said lateral net forming a five sided fishing net;
said locking mechanism comprises a full-width portion, a narrowing portion, a slot, and a pull tab;
said narrowing portion being connected adjacent to said full-width portion;
said pull tab being connected adjacent to said full-width portion opposite to said narrowing portion;
said slot being positioned along said full-width portion and said narrowing portion;
said slot traversing normal through said full-width portion and said narrowing portion;
said pivot axle being positioned through said slot;
said first arm and said second arm further each comprise an inner groove;
said inner groove traversing along said tapered end and into said intermediate portion;
said full-width portion being slidably engaged in between said inner groove of said first net head and said inner groove of said second net head;
said attachment post of said first net head being attached to said receiving end of said first arm;
said attachment post of said second net head being attached to said receiving end of said second arm;
said stop of said first net head and said stop of said second net head being positioned adjacent to each other; and
said brim for both said first net head and said second net head being located in between said net of said first net head and said net of said second net head.

* * * * *